J. E. STROMBERG.
PANORAMIC CAMERA.
APPLICATION FILED DEC. 11, 1918.
1,347,062.
Patented July 20, 1920.
3 SHEETS—SHEET 3.
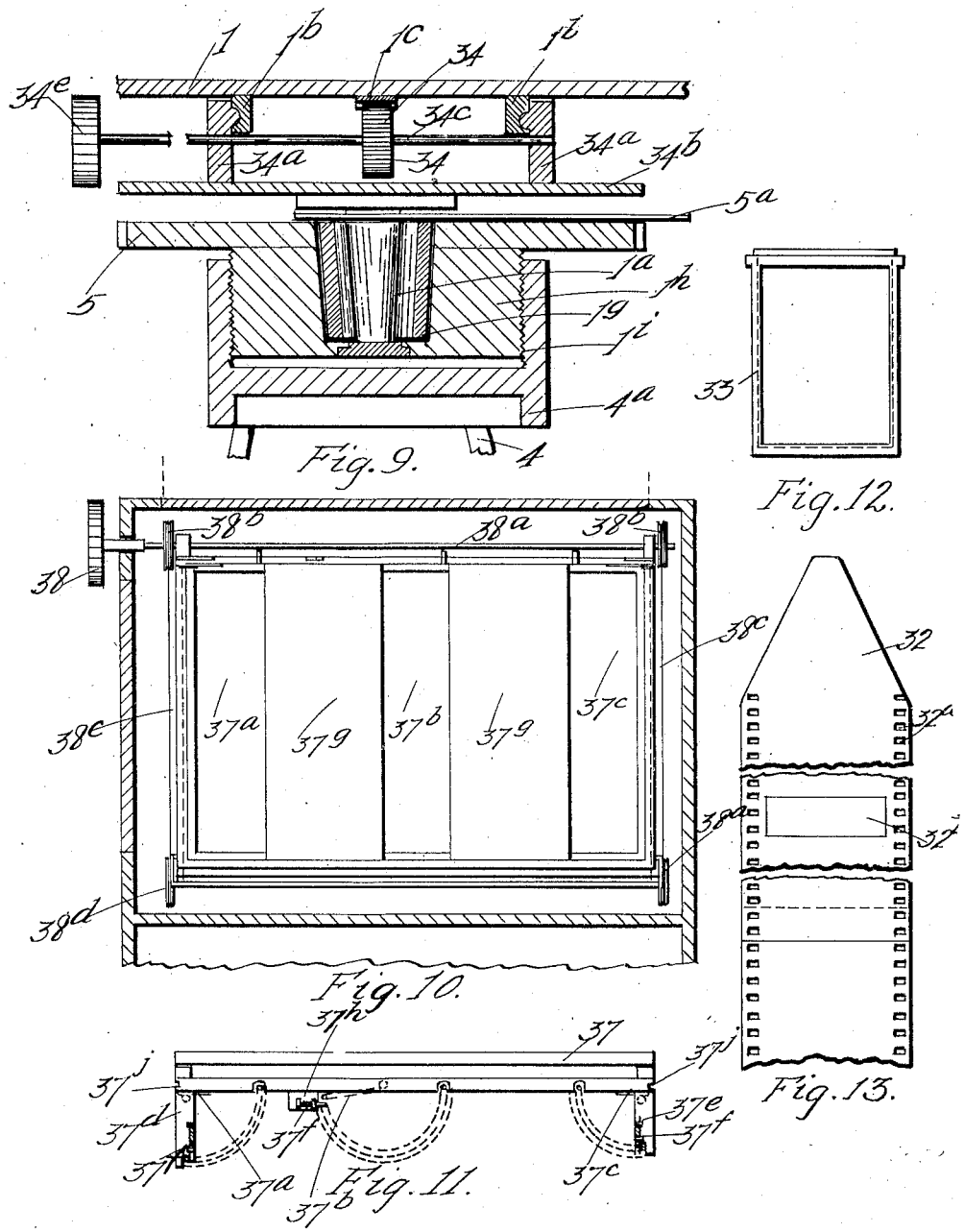

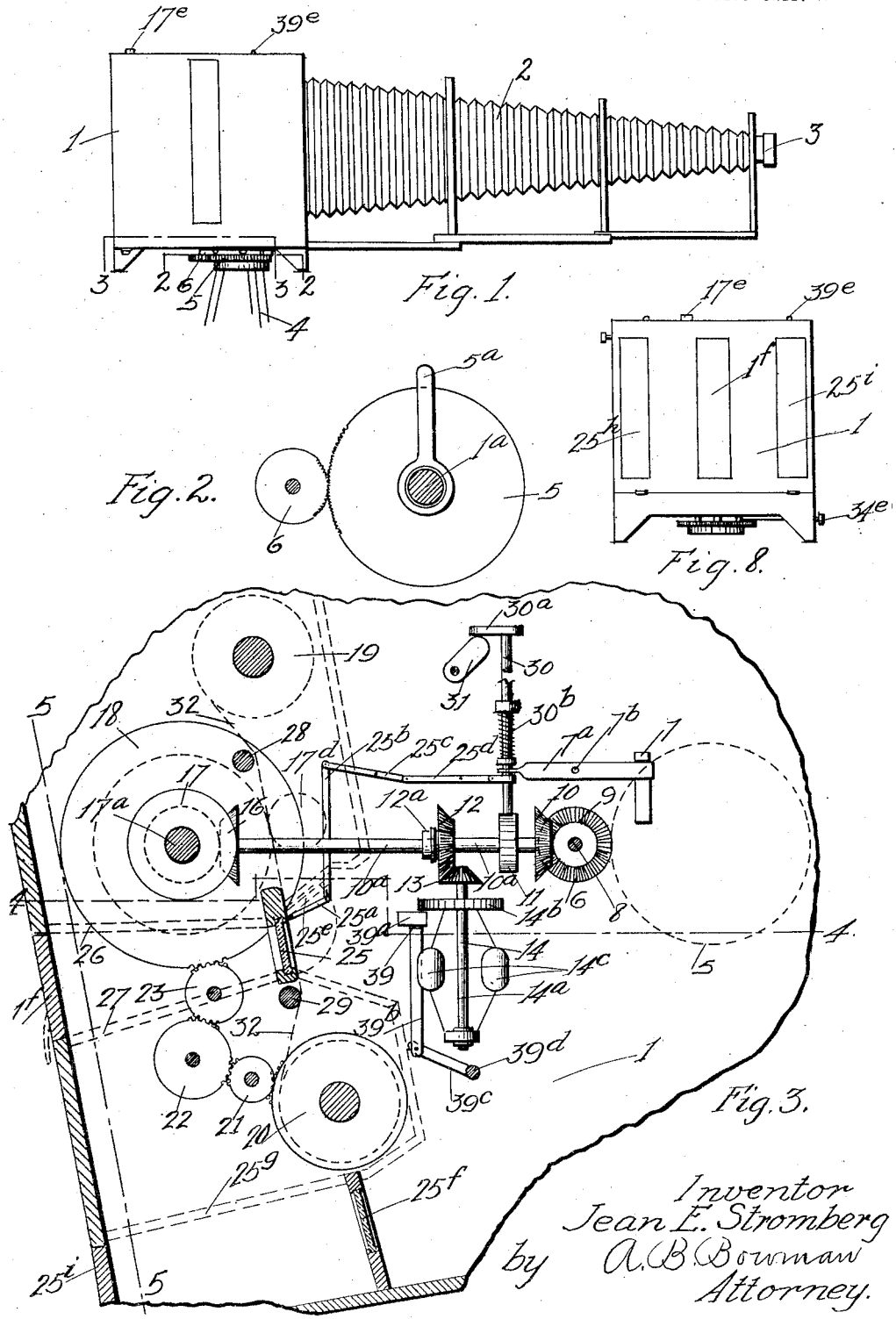

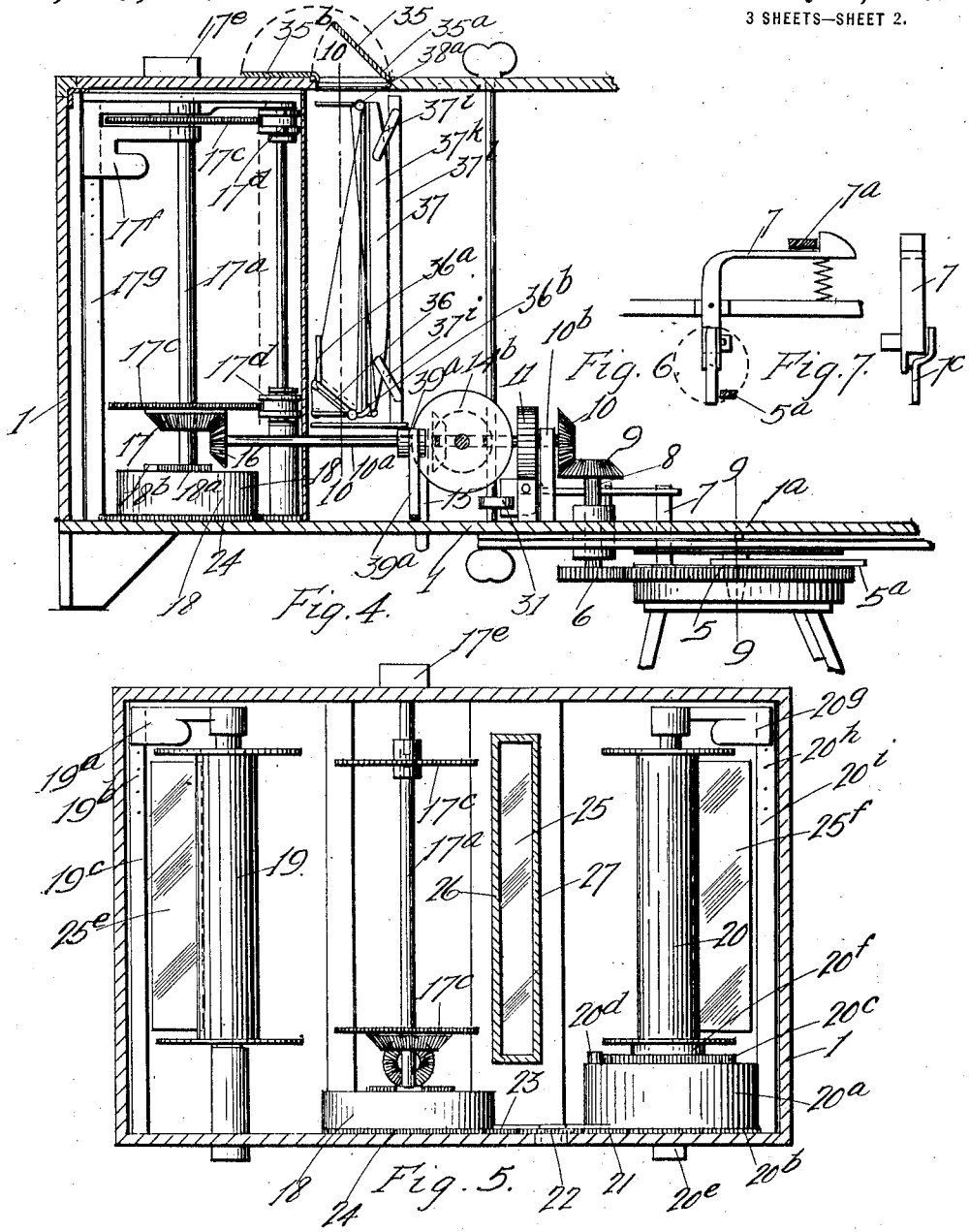

UNITED STATES PATENT OFFICE.

JEAN E. STROMBERG, OF SAN DIEGO, CALIFORNIA.

PANORAMIC CAMERA.

1,347,062.   Specification of Letters Patent.   Patented July 20, 1920.

Application filed December 11, 1918. Serial No. 266,293.

*To all whom it may concern:*

Be it known that I, JEAN E. STROMBERG, a citizen of the United States, residing at San Diego, in the county of San Diego and State of California, have invented certain new and useful Improvements in Panoramic Cameras, of which the following is a specification.

My invention relates to a camera which is adapted to revolve on a vertical axis usually termed a panoramic camera and the objects of my invention are first, to provide a camera of this class which is adapted to revolve at a rapid speed and each of the parts or members perform their functions in proper sequence, second, to provide a camera of this class in which the film moves at the same speed relatively as the lens during the complete unwinding of the film thus providing uniformity of the relative speed of the film and lens, third, to provide a means for positioning the camera so that the same camera may be used for other purposes than panoramic, fourth, to provide means for determining from the outside of the camera the amount of film used or remaining in the camera unused, fifth, to provide means for regulating some of the moving parts and for disengaging said regulating means, sixth, to provide novelly constructed operating means for the various operating parts of a panoramic camera, seventh, to provide novel means for regulating and controlling the speed of the camera and its operating parts, eighth, to provide a camera of this class which is simple and economical of construction, in accordance with the functions performed, durable, easy to operate and which will not readily deteriorate or get out of order, ninth, to provide a camera of this class in which the parts may be so regulated that any portion of the panorama may be taken, and which may be removed, set up in a new location and refocused without removing or disturbing the film, tenth, to provide a camera of this class with a focusing device for plates when used as an ordinary camera other than film or panoramic, eleventh, to provide a camera of this class which may be used for either plates or films as desired and means for focusing for either, without disturbing the film in its position, twelfth, to provide means for releasing the speed governing device and permitting an unretarded speed, thirteenth, to provide a camera of this class with means for placing and holding a plate holder so that a rectangular picture may be made with it either perpendicularly or horizontally, fourteenth, to provide a camera of this class with means for permitting the camera to pass over the tripping device and then make a complete circuit before the automatic stopping device is operated and fifteenth, to provide a double means for moving and regulating the film in its movement.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of the camera with the lens in its extended position and showing a fragmentary portion only, of the tripod support; Fig. 2 is a sectional view through 2—2 of Fig. 1; Fig. 3 is a fragmentary sectional view on an enlarged scale through 3—3 of Fig. 1; Fig. 4 is a sectional view through 4—4 of Fig. 3; Fig. 5 is a reduced sectional view through 5—5 of Fig. 3; Fig. 6 is a detailed side elevational view of the releasing latch; Fig. 7 is an edge view at a right angle thereto; Fig. 8 is a rear end view of the camera as shown in Fig. 1; Fig. 9 is an enlarged sectional view through 9—9 of Fig. 4; Fig. 10 is a sectional view through 10—10 of Fig. 4. Fig. 11 is a top view of the translucent plate positioning apparatus; Fig 12 is a side elevational view of the plate or film holding frame and Fig. 13 is a fragmentary side elevational view of one form of a continuous film used for panoramic purposes.

Similar characters of reference refer to similar parts and portions throughout the several views of the drawings.

The casing 1, bellows, 2, lens 3, tripod 4, gear 5, pinion 6, latch 7, shaft 8, bevel gear 9, bevel gear 10, brake wheel 11, bevel gear 12, governor bevel gear 13, governor 14, bevel gear shift 15, bevel gears 16 and 17, spring 18, film reels 19 and 20, spur gears 21, 22, 23, 24 and $20^b$ translucent glasses 25, $25^e$, and $25^f$, supporting partitions 26 and 27, film guides 28 and 29, brake member 30, brake operating lever 31, film 32, plate frame 33, shifting gear 34, mirror 35, mirror 36, camera setting apparatus 37, translucent glasses $37^a$, 37$^b$ and 37$^c$, camera focusing apparatus 38, and governor brake 39, constitute the principal parts of my camera.

The casing 1 is of the proper shape to inclose the working mechanism and the bellows 2 when in its collapsed form. This casing 1 is pivotally supported on the tripod by means of the axle 1$^a$. The bottom of the casing 1 is provided with grooved guide members 1$^b$, shown best in Fig. 9, adapted to be engaged by the guide members 34$^a$ which are secured to a horizontal plate 34$^b$ and mounted in these guide members 34$^a$ is a shaft 34$^c$ which is provided with a gear 34 which meshes with a gear rack 1$^c$ on the bottom of the casing 1 and on the extended end of the shaft 34$^c$ is a hand wheel 34$^e$ so that the casing 1 may be shifted relatively to its supporting member by turning the hand wheel 34$^e$, thus providing a means for disengaging the pinion 6 from the gear 5, permitting the camera to be swung around in the position desired, and permitting the substitution of other gears 6, of various sizes for the alteration of the speed of the travel of the film 32, and keeping its movement proportional to the movement of the lens 3 when in other than its full extended position. The plate 34$^b$ is provided on its under side with the axle 1$^a$ which fits into a conforming recess 1$^g$ in the plate 1$^h$ and this plate 1$^h$ is provided with a threaded portion 1$^i$ which fits into a conforming plate 4$^a$ secured onto the upper end of the tripod 4 thus providing for the pivotal movement of the casing 1 relatively to the tripod 4. Secured to this member 1$^h$ is a gear 5 with which the pinion 6 meshes so that when the pinion 6 revolves as will hereinafter be described the casing 1 revolves on said tripod 4 by means of the axle 1$^a$. The pinion 6 is mounted on a shaft 8 which is journaled in the lower side of the casing 1 and on the upper end of this shaft 8 is provided a bevel gear 9 which meshes with another bevel gear 10 which is mounted on a shaft 10$^a$. This shaft 10$^a$ is journaled in a support 10$^b$ extending from the bottom of the casing 1. Mounted on the other side of the support 10$^b$ is a brake wheel 11. Mounted on the extended end of the shaft 10$^a$ is a bevel gear 16, which meshes with another bevel gear 17 on the shaft 17$^a$. Mounted on this shaft 17$^a$ is a coil spring 18, which is the main operating spring for revolving the gears as hereinbefore described. Mounted on the shaft 10$^a$ is a bevel gear 12 which engages with the bevel gear 13 of the governor 14. Mounted on the governor shaft 14$^a$ is a circular plate 14$^b$, which is fastened to the governor arms 14$^c$ and intended to slide out along the shaft 14$^a$ as the speed of the governor increases. Shiftably mounted on the bottom of the casing 1 is the governor brake member 39, the extended portion 39$^a$ of which extends to a position in line with the shaft 14 of the governor. This extended portion 39$^a$ of the governor brake 39 is intended to be set in any location desired by means of the link 39$^b$, the arm 39$^c$ and the shaft 39$^d$. By revolving the shaft 39$^d$, the extended arm 39$^a$ may be moved forward and backward in such a manner as to form a friction brake with the member 14$^b$ of the governor, thus regulating the speed of its travel. Mounted on the upper end of the shaft 39$^d$ is a handle 39$^e$ for turning the shaft 39$^d$ as before described.

The bevel gear 12 is mounted on the shaft 10$^a$ and is adapted to be shifted into and out of engagement with the bevel gear 13 thus releasing the shaft 10$^a$ from the governor 14 by means of a shifting device 15 which extends outwardly through the lower side of the casing 1 thus disengaging the entire governor 14. Mounted on the bottom of the casing 1 is a brake member 30 which is provided with a tension spring 30$^b$ tending to hold said brake member in engagement with the brake wheel 11 at all times. This brake member 30 is provided with an extended member 30$^a$ on its outward end which is adapted to be engaged by the lever 31 for releasing said brake member 30 from the brake wheel 11 when turned in the proper direction. Mounted on this brake member 30 is a lever 7$^a$ which is pivoted intermediate its ends at 7$^b$ and its other end engages the latch 7 which extends down through the bottom of the casing 1 and its lower end is adapted to engage with a trip arm 5$^a$. Pivotally mounted on the top of the gear 5 is a trip arm 5$^a$, the latch 7 striking the trip arm 5$^a$ to release the lever 7$^a$ and allowing the brake member 30 to become immediately engaged with the brake wheel 11. Pivotally mounted on the lower end of the latch 7 is a trip member 7$^c$, so positioned that it trips when engaged by the latch 7 allowing the latch 7 to pass over the trip member 5$^a$ without disengaging the latch 7 from the lever 7$^a$ on its first round, but when it is reversed, becomes a solid arm and upon striking the trip member 5$^a$ will spring the latch 7 and release the lever 7$^a$. On the other side of the brake member 30 are mounted a series of links 25$^a$, 25$^b$, 25$^c$ and 25$^d$ so set that upon the releasing of the lever 7$^a$ they will close a trap door 25$^e$, thus forming a shutter for the film 32.

Mounted on the shaft 17$^a$ below the spring 18, is a gear 24 which engages another gear 23 which in turn engages another gear 22 and in the shaft upon which the gear 22 is mounted is provided a slot in the end adapted for a key so that the spring 18 is wound through the gears 22, 23, and 24. Mounted on the shaft 17$^a$ adjacent to the spring 18 is a ratchet 18ª and secured to the spring casing is a ratchet pawl 18ᵇ which is adapted to take up the movement of the spring and stop its unwinding should the brake member 30 be released for any cause. This shaft 17ª is provided with two gears thereon 17ᶜ which are spaced the proper distance for engaging the notches 32ª in the film 32 shown best in Fig. 13 and meshing with these gears 17ᶜ are pinions 17ᵈ revolubly mounted in the casing and the film is unwound by contact of the gear teeth on the gear 17ᶜ and held in position by the pinion 17ᵈ. It will be here noted however that these members 17ᵈ and 17ᶜ could be smooth friction members and the slots 32ª in the film elminated if desired and the film would be moved by friction instead of by notched contact. Engaging with the shaft 17ª at its upper end is a conventional foot and inch meter 17ᵉ mounted on the top outer surface of the casing 1 adapted to indicate the amount of film used by the revolution of the shaft 17ª. Mounted on the upper end of the shaft 17ª is an adjusting member 17ᶠ. This adjusting member 17ᶠ is adapted to be moved up and down the support member 17ᵍ and to regulate the distance between the members 17ᶜ, permitting film 32 of various widths to be properly adjusted to form a correct meshing of the gear teeth 17ᶜ with the slots 32ª.

The film spool 19 is revolubly mounted in the casing in the conventional manner, and provided for adjustment by means of a shiftable member 19ª adapted to be moved upwardly and downwardly on the support 19 and to be held in place by means of pins in the holes 19ᵇ for different widths of film. This spool 19 is the spool of unexposed film while the spool 20 carries the exposed film. The lower end of the support for the spool 20 is provided with a coil spring 20ª of sufficient strength to provide tension enough to take up the slack in the film as it is moved by the members 17ᶜ and 17ᵈ and this spring is wound by means of the same key and at the same time as the spring 18 through the gear 22 the intermediate gear 21 meshing with a gear 20ᵇ which is connected to the shaft of the spring 20ª. Secured to the shaft of the spring 20ª is a ratchet pawl 20ᵈ for the purpose of preventing the unwinding of spring 20ª when there is no film on the spool 20. Mounted on the inside of the shaft of the spring 20ª is a hand pawl 20ᵉ upon the upper end of which is a flat bar 20ᶠ, for connecting with the spool 20 in the conventional manner. This hand pawl 20ᵉ is intended to pull the flat bar 20ᶠ down and out of engagement with the slot of the film roller 20. The film roller 20 is provided for adjustment by means of a shiftable member 20ᵍ, adapted to move upwardly and downwardly, and supported by means of pins in the holes 20ʰ of the support member 20ⁱ, thus providing for the holding of different widths of film.

Mounted back of the film is a translucent plate 25. This plate is for the purpose of focusing and positioning the camera and it is done by positioning the film so that the slot 32ᵇ is over the translucent plate 25, and the door 1ᶠ of the casing 1 is open to permit the operator to observe the image cast on the translucent plate and thereby properly gage the position and focus of the camera. Mounted at the outer sides of the film rollers 19 and 20, and partitioned therefrom by the partitions 25ᵍ are the translucent plates 25ᵉ and 25ᶠ. These plates are for the purpose of focusing and positioning the camera and it is done by opening the doors 25ⁱ and 25ʰ of the casing 1, permitting the operator to observe the image on the translucent plates, and thereby focus and position the camera at any time, regardless of the position of the film 32. It will be noted that in order for the image to be thrown upon the translucent plate 25, the translucent plate 37ᵇ will have to be opened and fastened back in its position, shown best in Fig. 11, and held by the latch 37ᶠ. It will also be noted that in order for the image to be thrown upon the film 32, the translucent plate door 37ᵇ will have to be opened and fastened back with the latch 37ᶠ. It will also be noted that in order for the image to be thrown upon the translucent plates 25ᵉ and 25ᶠ the translucent plate doors 37ª and 37ᶜ will have to be opened and fastened back by means of the latches 37ᶠ. The film is supported in position by means of revoluble rolls 28 and 29, positioned vertically in the casing and alined so as to permit the film to pass directly in front of the translucent plate 25. It will be noted that the partitions 26 and 27 form supports for the translucent plate 25 and also for the shutter door 25ᵉ. It will be noted that the partitions 25ᵍ form supports for the translucent plates 25ᵉ and 25ᶠ. Mounted in front of the film and above the operating parts is a plate frame support 37 so that the plate frame 33, best shown in Fig. 12 of the drawing, may be inserted in position through the top or side of the camera case as described.

This is only used when it is desired to use the camera other than for panoramic purposes and the camera is focused and positioned for such use by means of the mirrors 35 and 36, and the translucent glasses 37ª, 37ᵇ, 37ᶜ and 37ᵍ. The mirror 36 reflects the image from the translucent glasses on to the mirror 35, which may be seen from the outside. The mirror 36 is positioned for a change to different angles by the turning of the hand wheel 38, which is mounted on the shaft 38ª. Upon the shaft 38ª are mounted the sheaves 38ᵇ upon which is mounted the cables 38ᶜ. These cables extend down over the sheaves 38ᵈ, which are mounted on a shaft at the lower end of the member 37. These cables are so attached to the mirror 36 that by revolving the hand wheel 38 the mirror cover 36ᵃ will first be lifted off the mirror and the mirror 36 raised from a level position up to an angle of approximately 45 degrees; this part being done by the taking up of the slack in the cables. Then the mirror 36 may be raised up and down the member 37 by means of the hand wheel 38, and the mirror arms 36ᵇ, being slipped up and down in the grooves 37ʲ, these cables being so arranged that by turning the hand wheel 38 in one direction, it will raise the mirror and turning it in the opposite direction, will lower the mirror, thus permitting the observer to examine the entire image thrown upon the translucent plates 37ᵃ, 37ᵇ, 37ᶜ, and 37ᵍ. Mounted on the member 37 are a plurality of translucent plates 37ᵃ, 37ᵇ, 37ᶜ and 37ᵍ. The translucent plates 37ᵃ and 37ᶜ are so mounted as to swing a quarter revolution as indicated by the dotted lines in Fig. 11 of the drawings, and to be fastened back in that position by means of the arms 37ᵉ and 37ᵈ, and the latch 37ᶠ, while the translucent plate 37ᵇ is adapted to swing a half revolution as indicated by the dotted lines in Fig. 11, and is fastened by means of the latch 37ᶠ, mounted on the arm 37ʰ. The plate frame support 37 has mounted on its sides springs 37ⁱ which permit the part 37ᵏ to be moved backward and the plate holder 33 placed either from the top or the side and between the members 37ᵏ and 37ˡ. The mirror 35 is mounted in the door 35ᵃ at the top of the camera, and when closed for the operation of the film part of the camera, is protected from casting reflections by means of the door 35ᵇ which closes under and covers the mirror 35. The plate frame holder 37 may be removed from the camera by means of the doors 35ᵃ and 35ᵇ.

Though I have shown and described a particular construction, combination and arrangement of parts and portions I do not wish to be limited to this particular construction, combination, and arrangement but desire to include in the purview of my invention the construction, combination and arrangement substantially as set forth in the appended claims.

It is obvious that with this construction there is provided a panoramic camera which revolves by the action of the unwinding of a spring, that the camera may be shifted forwardly and backwardly on the tripod support for throwing the revolving mechanism out of gear, that the film is unwound automatically with the revolving of the camera on the tripod so that the film travels at a uniform speed at all times regardless of whether the film is just starting to be used or nearly used up, that there is provided means for regulating the speed of the camera from the outside, that there is provided means for determining the quantity of the film used or the quantity not used still in the camera, that there is provided means for focusing and positioning the camera so that it may be used for stationary purposes or for panoramic purposes as desired, that the camera is constructed of durable parts and therefore not subject to early deterioration.

Having thus described my invention what I claim as new and desire to secure by Letters Patent is:

1. In a camera of the class described, a camera case revolubly mounted upon a vertical axis, gear, shaft, and spring means for revolving said camera case, means for holding it from revolving, and means for shifting said camera case forwardly and backwardly relatively to said tripod.

2. In a camera of the class described, a camera case revolubly mounted upon a vertical axis, gear, shaft and spring means for revolving said camera case, means for holding it from revolving, means for shifting said camera case forwardly and backwardly relatively to said tripod, and means for uniformly transferring the film from one spool to another back of the lens.

3. In a camera of the class described, the combination with a lens, bellows and casing, of a pair of film rolls spaced apart from each other, means for providing a tension on one of said rolls at all times, a translucent glass back of said film and revoluble means engaging said film on opposite sides for moving said film from one film roll toward the other.

4. In a camera of the class described, the combination with a lens, bellows and casing, of a pair of film rolls spaced apart from each other, means for providing a tension on one of said rolls at all times, a translucent glass back of said film, revoluble means engaging said film on opposite sides for moving said film from one film roll toward the other, and means automatically operated by the movement of said camera for covering said film in front of said translucent glass.

5. In a camera of the class described, the combination with a lens, bellows and casing, of a tripod upon which said casing is revolubly mounted, a gear mounted in connection with said tripod, a pinion secured to said casing adapted to mesh with said gear and means for shifting said casing relatively to said gear whereby said gear and said pinion may be shifted out of engagement with each other.

6. In a camera of the class described, the combination with a lens, bellows, and casing, of a tripod upon which said casing is revolubly mounted, a gear mounted in connection with said tripod, a pinion secured to said casing adapted to mesh with said gear, means for shifting said casing relatively to said gear whereby said gear and said pinion may be shifted out of engagement with each other, a trip lever secured in connection with said gear and a trip means operating from the outside of the casing for engaging said trip member and stopping the revolution of said camera after one revolution or after a second revolution as predetermined.

7. In a camera of the class described, the combination with a lens, bellows and casing revolubly mounted on a tripod, of gear and pinion means for revolving said casing relatively to said tripod, a film winding apparatus in said casing and gear and pinion means in operative relation with said casing, revolving mechanism engaging the edges of said film for moving said film the same relative speed with the movement of said lens.

8. In a camera of the class described, the combination with a lens, bellows and casing revolubly mounted on a tripod, of gear and pinion means for revolving said casing relatively to said tripod, a film winding apparatus in said casing, gear and pinion means in operative relation with said casing, revolving mechanism engaging the edges of said film for moving said film the same relative speed with the movement of said lens, and means in said casing for focusing said camera without removing the film at any point in its revolution.

9. In a camera of the class described, the combination with a lens, bellows and casing revolubly mounted on a tripod, of gear and pinion means for revolving said casing relatively to said tripod, a film winding apparatus in said casing, gear and pinion means in operative relation with said casing, revolving mechanism engaging the edges of said film for moving said film the same relative speed with the movement of said lens, means in said casing for focusing said camera without removing the film at any point in its revolution, and means for stopping said camera at any point in its revolution as predetermined.

10. In a camera of the class described, the combination with a lens, bellows and casing revolubly mounted on a tripod, of gear and pinion means for revolving said casing relatively to said tripod, a film winding apparatus in said casing, gear and pinion means in operative relation with said casing, revolving mechanism engaging the edges of said film for moving said film the same relative speed with the movement of said lens, means in said casing for focusing said camera without removing the film at any point in its revolution, means for stopping said camera at any point in its revolution as predetermined, and a governor for regulating the speed of the movement of said camera and film winding apparatus.

11. In a camera of the class described, the combination with a lens, bellows and casing revolubly mounted on a tripod, of gear and pinion means for revolving said casing relatively to said tripod, a film winding apparatus in said casing, gear and pinion means in operative relation with said casing, revolving mechanism engaging the edges of said film for moving said film the same relative speed with the movement of said lens, means in said casing for focusing said camera without removing the film at any point in its revolution, means for stopping said camera at any point in its revolution as predetermined, a governor for regulating the speed of the movement of said camera and film winding apparatus, and means extending to the outside of the casing for releasing said governor whereby said camera will have unretarded movement.

12. In a camera of the class described, a casing carrying a bellows and lens revolubly mounted upon a tripod, a gear revolubly mounted relatively to said tripod, a pinion mounted on a shaft journaled in said casing adapted to engage said gear and means for shifting said casing relatively to said gear whereby said gear and pinion may be shifted into and out of engagement with each other.

13. In a camera of the class described, a casing carrying a bellows and lens revolubly mounted upon a tripod, a gear revolubly mounted relatively to said tripod, a pinion mounted on a shaft journaled in said casing adapted to engage said gear, means for shifting said casing relatively to said gear whereby said gear and pinion may be shifted into and out of engagement with each other, gear shaft and spring means for revolving said pinion, a pair of spaced apart film rolls, a film adapted to be wound from one film roll to the other, a plurality of gears engaging the opposite side of said film in operative relation with said gear shaft and spring means for winding said film from one spool to the other.

14. In a camera of the class described, a casing carrying a bellows and lens revolubly mounted upon a tripod, a gear revolubly mounted relatively to said tripod, a pinion mounted on a shaft journaled in said casing adapted to engage said gear and means for shifting said casing relatively to said gear whereby said gear and pinion may be shifted into and out of engagement with each other, gear shaft and spring means for revolving said pinion, a pair of spaced apart film rolls, a film adapted to be wound from one film roll to the other, a plurality of gears engaging the opposite side of said film in operative relation with said gear, shaft and spring means for winding said film from one spool to the other, means for automatically stopping the revolution of said casing and the winding of said film as predetermined.

15. In a camera of the class described, a casing carrying a bellows, and lens revolubly mounted upon a tripod, a gear revolubly mounted relatively to said tripod, a pinion mounted on a shaft journaled in said casing adapted to engage said gear and means for shifting said casing relatively to said gear whereby said gear and pinion may be shifted into and out of engagement with each other, gear shaft and spring means for revolving said pinion, a pair of spaced apart film rolls, a film adapted to be wound from one film roll to the other, a plurality of gears engaging the opposite side of said film in operative relation with said gear shaft and spring means for winding said film from one spool to the other, means for automatically stopping the revolution of said casing and the winding of said film as predetermined, and means extending to the outer side of said casing for manually regulating said automatic means.

16. In a camera of the class described, a casing carrying a bellows and lens revolubly mounted upon a tripod, a gear revolubly mounted relatively to said tripod, a pinion mounted on a shaft journaled in said casing adapted to engage said gear, means for shifting said casing relatively to said gear whereby said gear and pinion may be shifted into and out of engagement with each other, gear, shaft and spring means for revolving said pinion, a pair of spaced apart film rolls, a film adapted to be wound from one film roll to the other, a plurality of gears engaging the opposite side of said film in operative relation with said gear shaft and spring means for winding said film from one spool to the other, means for automatically stopping the revolution of said casing and the winding of said film as predetermined, means extending to the outer side of said casing for manually regulating said automatic means, and a governor in connection with said gear shaft and spring means for regulating the speed thereof.

17. In a camera of the class described, a casing carrying a bellows and lens revolubly mounted upon a tripod, a gear revolubly mounted relatively to said tripod, a pinion mounted on a shaft journaled in said casing adapted to engage said gear, means for shifting said casing relatively to said gear whereby said gear and pinion may be shifted into and out of engagement with each other, gear, shaft and spring means for revolving said pinion, a pair of spaced apart film rolls, a film adapted to be wound from one film roll to the other, a plurality of gears engaging the opposite side of said film in operative relation with said gear, shaft and spring means for winding said film from one spool to the other, means for automatically stopping the revolution of said casing and the winding of said film as predetermined, means extending to the outer side of said casing for manually regulating said automatic means, a governor in connection with said gear, shaft and spring means for regulating the speed thereof, and means for releasing and disengaging said governor whereby said camera and its operative means will have unretarded movement.

18. In a camera of the class described, the combination of a casing with extendable lens, a tripod upon which said casing is revolubly mounted, means for revolving said casing relatively to said tripod, a film winding apparatus in said casing, means in connection with the film of said film winding apparatus for moving said film lineally at the same relative speed as the movement of said lens in its variable extended position.

In testimony whereof I have hereunto set my hand at San Diego, California, this 4th day of December, 1918.

JEAN E STROMBERG.